(12) United States Patent
Nie et al.

(10) Patent No.: US 9,521,598 B2
(45) Date of Patent: Dec. 13, 2016

(54) PERFORMING HANDOVER FROM A SECOND GENERATION RAT TO A FOURTH GENERATION RAT

(71) Applicant: Apple Inc., Cupertino, CA (US)

(72) Inventors: Xiao Nie, Beijing (CN); Yaoqi Yan, Beijing (CN); Wanping Zhang, San Jose, CA (US); Qiang Miao, Tian Jin (CN); Jianxiong Shi, Dublin, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 14/288,895

(22) Filed: May 28, 2014

(65) Prior Publication Data

US 2015/0312807 A1    Oct. 29, 2015

Related U.S. Application Data

(60) Provisional application No. 61/982,910, filed on Apr. 23, 2014.

(51) Int. Cl.
*H04W 36/00*   (2009.01)
*H04W 36/14*   (2009.01)

(52) U.S. Cl.
CPC ......... *H04W 36/0083* (2013.01); *H04W 36/14* (2013.01)

(58) Field of Classification Search
USPC .......................... 455/436–444; 370/331–334
See application file for complete search history.

(56) References Cited

U.S. PATENT DOCUMENTS

| | | | |
|---|---|---|---|
| 8,521,167 B2 | 8/2013 | Magadi Rangaiah et al. | |
| 2010/0093356 A1 | 4/2010 | Lee et al. | |
| 2012/0028641 A1 | 2/2012 | Iwamura et al. | |
| 2013/0059586 A1* | 3/2013 | Hao | H04W 48/12 455/436 |
| 2013/0114405 A1 | 5/2013 | Kim et al. | |

(Continued)

FOREIGN PATENT DOCUMENTS

| | | |
|---|---|---|
| DE | 102012105103 | 12/2013 |
| DE | 102013111887 | 5/2014 |

OTHER PUBLICATIONS

Office Action for German Patent Application No. 10 2015 206640.1, Sep. 26, 2016, pp. 1-17.

(Continued)

*Primary Examiner* — Marcus Hammonds
(74) *Attorney, Agent, or Firm* — Meyertons Hood Kivlin Kowert & Goetzel, P.C.; Jeffrey C. Hood; Joel L. Stevens

(57) ABSTRACT

Transitioning a UE from a first RAT to a third RAT in an area having a first RAT, a second RAT, and a third RAT. The first RAT may be a second generation RAT, the second RAT may be a third generation RAT, and the third RAT may be a fourth generation RAT. The network of the first RAT may not provide information (e.g., a neighbor list) for the third RAT. The UE may use information to perform measurement of one or more base stations of the third RAT without attaching to the second RAT. For example, the UE may use pre-stored information to perform measurement of the third RAT. Alternatively, or additionally, the UE may receive the information (e.g., from a system information block) from the second RAT without attaching to the second RAT. The UE may then transition to from the first RAT to the third RAT.

20 Claims, 12 Drawing Sheets

(56) References Cited

U.S. PATENT DOCUMENTS

2013/0225169 A1    8/2013  Farnsworth et al.
2014/0287753 A1*   9/2014  Schulist ............ H04W 36/0022
                                                    455/436
2014/0295797 A1*  10/2014  Moisanen ............. H04W 12/06
                                                    455/411
2014/0378140 A1*  12/2014  Gopal ................ H04W 76/048
                                                    455/437

OTHER PUBLICATIONS

Evolved Universal Terrestrial Radio Access (E-UTRA); Radio Resource Control (RRC); Protocol Specification; ETSI TS 136 331 V12.4.1; Feb. 2015; pp. 1-415.

* cited by examiner

PERFORMING HANDOVER FROM A SECOND GENERATION RAT TO A FOURTH GENERATION RAT

PRIORITY INFORMATION

The present application claims benefit of priority to provisional patent application No. 61/982,910, entitled "Performing Handover from a Second Generation RAT to a Fourth Generation RAT, filed on Apr. 23, 2014, whose inventors are Xiao Nie, Yaoqi Yan, Wanping Zhang, Qiang Miao, and Jianxiong Shi.

FIELD OF THE INVENTION

The present application relates to wireless devices, and more particularly to a system and method for transitioning from a second generation RAT to a fourth generation RAT.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE. Further, where a UE is configured to support multiple radio access technologies (RATs), certain performance degradations can occur on one or more of the RATs, such as due to tune-away operations of the other RAT. As a result, techniques are desired which provide power savings and/or improved performance in such wireless UE devices.

New and improved cellular radio access technologies (RATs) are sometimes deployed in addition to existing RATs. For example, networks implementing Long Term Evolution (LTE) technology, developed and standardized by the Third Generation Partnership Project (3GPP), are currently being deployed. LTE and other newer RATs often support faster data rates than networks utilizing legacy RATs, such as various second generation (2G) and third generation (3G) RATs.

However, in some deployments, LTE and other new RATs may not fully support some services that can be handled by legacy networks. Accordingly, LTE networks are often co-deployed in overlapping regions with legacy networks and UE devices may transition between RATs as services or coverage may require. For example, in some deployments, LTE networks are not capable of supporting voice calls. Thus, for example when a UE device receives or initiates a circuit switched voice call while connected to an LTE network that does not support voice calls, the UE device can transition to a legacy network, such as one which uses a GSM (Global System for Mobile Communications) RAT or a "1X" (Code Division Multiple Access 2000 (CDMA2000) 1X) RAT that supports voice calls, among other possibilities.

Additionally, while service providers may provide 2G, 3G, and 4G services in an area, they may not support direct transition from 2G to 4G, e.g., by providing a neighbor list of 4G base stations while connected to a 2G base station. Because of this, delays in transitions from the 2G RAT to the 4G RAT may result, which is undesirable. Accordingly, improvements in wireless communication are desired.

SUMMARY OF THE INVENTION

Embodiments described herein relate to a User Equipment (UE) device and associated method for operating the UE device. The UE device may have one or more radios for performing cellular communication or may include only a single radio for performing cellular communication, as desired. The UE may be in an area that may have a first radio access technology (RAT), a second RAT, and a third RAT. The first RAT may be a second generation RAT, such as global system for mobile communications (GSM). The second RAT may be a third generation RAT, such as time division synchronous code division multiple access (TD-SCDMA or "TDS" for short). The third RAT may be a fourth generation RAT, such as long term evolution (LTE). In one embodiment, the network of the first RAT may not provide information (e.g., a neighbor list) for the third RAT.

The UE may initially communicate with a base station of the first RAT. While maintaining a connection to the base station of the first RAT, the UE may perform base station measurement of the third RAT (e.g., using a single radio of the UE). Because the first RAT may not provide information regarding base stations of the third RAT, the UE may use or obtain information for performing the base station measurement of the third RAT.

For example, the UE may perform detection or measurement of one or more base stations of the second RAT. While performing the detection or measurement, the UE may receive information for performing the base station measurement of the third RAT. For example, the UE may receive system information (e.g., from system information block (SIB) 19) provided by a base station of the second RAT. For example, this information may specify frequency information for performing measurement or detection of the third RAT. Alternatively, or additionally, the information may be a neighbor list. Note that the UE may not attach to the second RAT in order to receive this information and may also maintain its connection to the first RAT, e.g., using the single radio.

Alternatively, instead of receiving information from a second RAT base station, the UE may use previously stored information to perform measurement for the third RAT. For example, the UE may store a frequency list associated with the third RAT, such as an evolved absolute radio frequency channel number (EARFCN) list. In some embodiments, such information may have been loaded prior to communicating with the first RAT (e.g., the UE may have a stored frequency list in firmware and/or may be updated periodically over time, such as when connected to the second or third RAT.

If the measurement and/or detection of the third RAT results in locating one or more base stations of the second RAT, quality metrics of a candidate base station of the third RAT may be compared to a threshold. For example, one or more signal quality metrics may be compared to associated threshold(s).

If the metrics exceed the threshold, or generally are acceptable in comparison to the threshold, the UE may transition from the base station of the first RAT to the base station of the third RAT.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
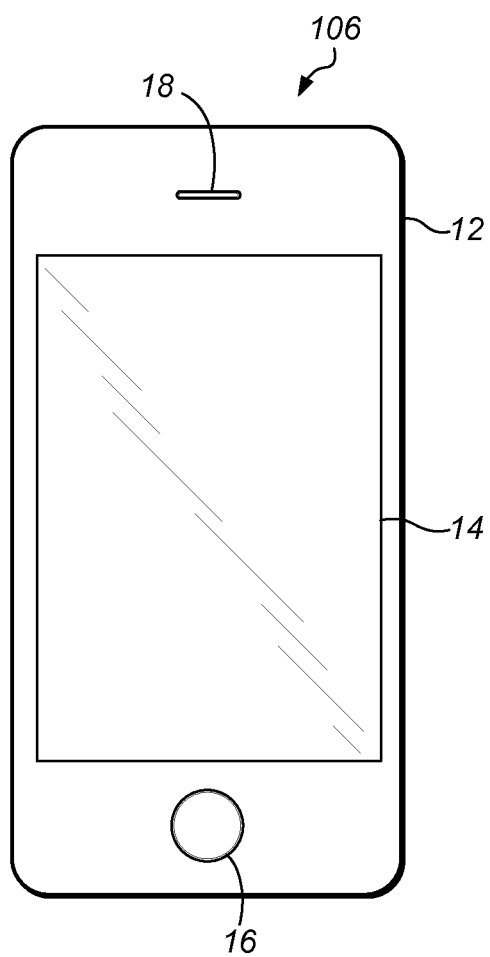
FIG. 1 illustrates an example user equipment (UE) according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
TDS: Time Division Synchronous Code Division Multiple Access
LTE: Long Term Evolution
RAT: Radio Access Technology
TX: Transmit
RX: Receive Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to one embodiment. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1XRTT or other CDMA radio access technologies), Time Division Synchronous Code Division Multiple Access (TD-SCDMA or TDS), Long Term Evolution (LTE), Advanced LTE, and/or other RATs. For example, the UE 106 may support at three RATs, such as GSM, TDS, and LTE. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains, e.g., that operate on the same frequency. In another embodiment, the UE 106 comprises two or more radios, i.e., two or more TX/RX chains (two or more TX chains and two or more RX chains).

In the embodiment described herein, the UE 106 comprises two antennas which may be used to communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The first and second receiver chains may share a common local oscillator, which means that both of the first and second receiver chains tune to the same frequency. The first and second receiver chains may be referred to as the primary receiver chain (PRX) and the diversity receiver chain (DRX).

In one embodiment, the PRX and DRX receiver chains operate as a pair and time multiplex among two or more RATs, such as LTE and one or more other RATs such as GSM or CDMA1x. In the primary embodiment described herein the UE 106 comprises one transmitter chain and two receiver chains (PRX and DRX), wherein the transmitter chain and the two receiver chains (acting as a pair) time multiplex between two (or more) RATs, such as LTE and GSM.

Each antenna may receive a wide range of frequencies such as from 600 MHz up to 3 GHz. Thus, for example, the local oscillator of the PRX and DRX receiver chains may tune to a specific frequency such as an LTE frequency band, where the PRX receiver chain receives samples from antenna 1 and the DRX receiver chain receives samples from antenna 2, both on the same frequency (since they use the same local oscillator). The wireless circuitry in the UE 106 can be configured in real time depending on the desired mode of operation for the UE 106. In the example embodiment described herein, the UE 106 is configured to support LTE and GSM radio access technologies.

Figure 2:
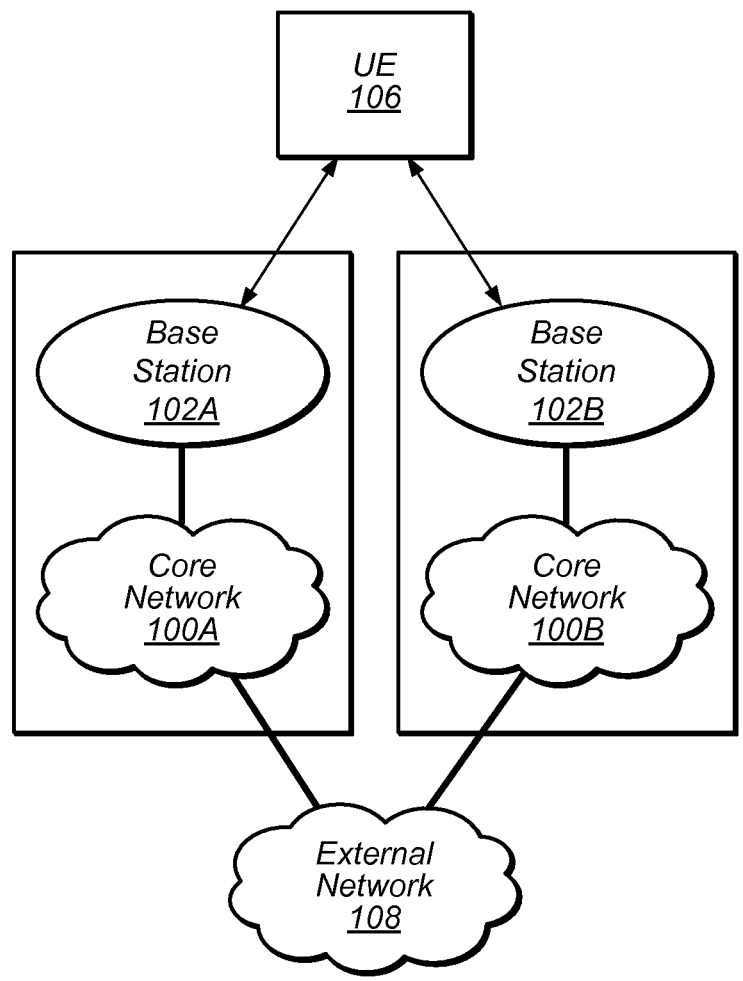
FIG. 2 illustrates an example wireless communication system where a UE communicates with two base stations using two different RATs.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), TDS, LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, TDS, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and TDS, LTE and GSM and TDS, and/or any other combination of RATs) might be coupled to a network or service provider that also supports the different cellular communication technologies. In one embodiment, the UE 106 may be configured to use a first RAT that is a packet-switched technology (e.g., LTE) and a second RAT that is a circuit-switched technology (e.g., GSM or TDS).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
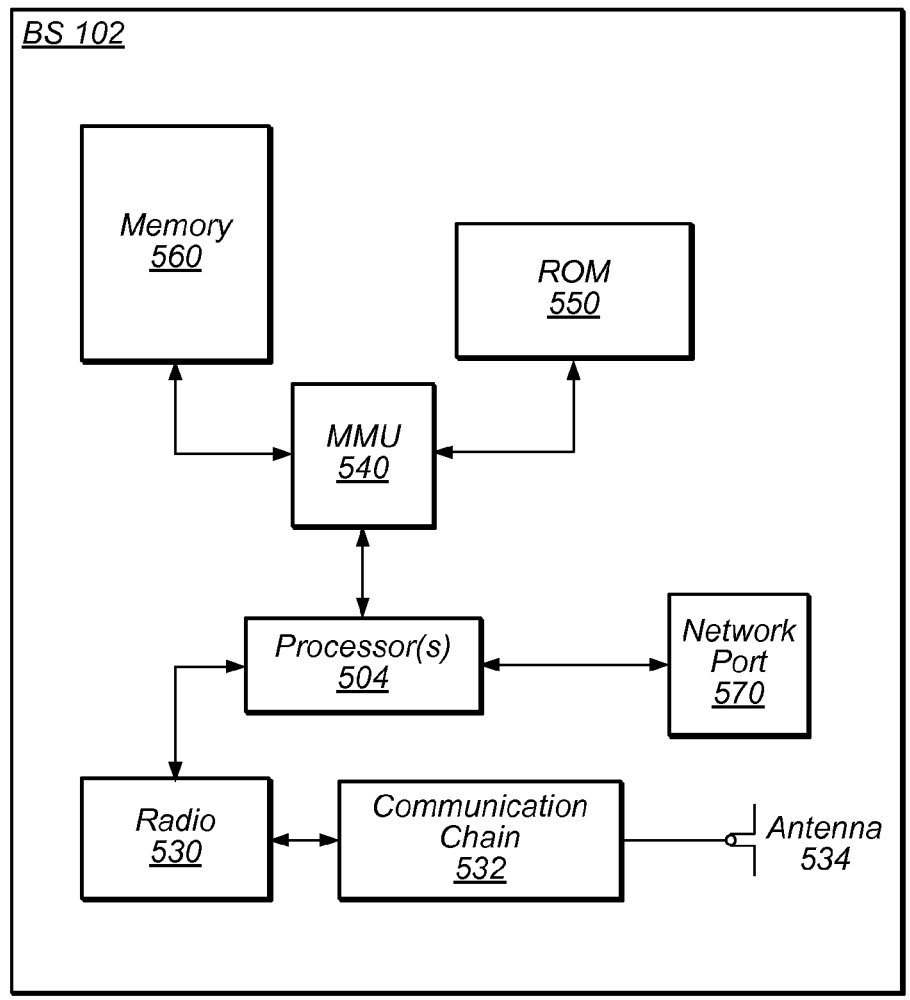
FIG. 3 is an example block diagram of a base station, according to one embodiment.

FIG. 3—Base Station

FIG. 3 illustrates an exemplary block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, TDS, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
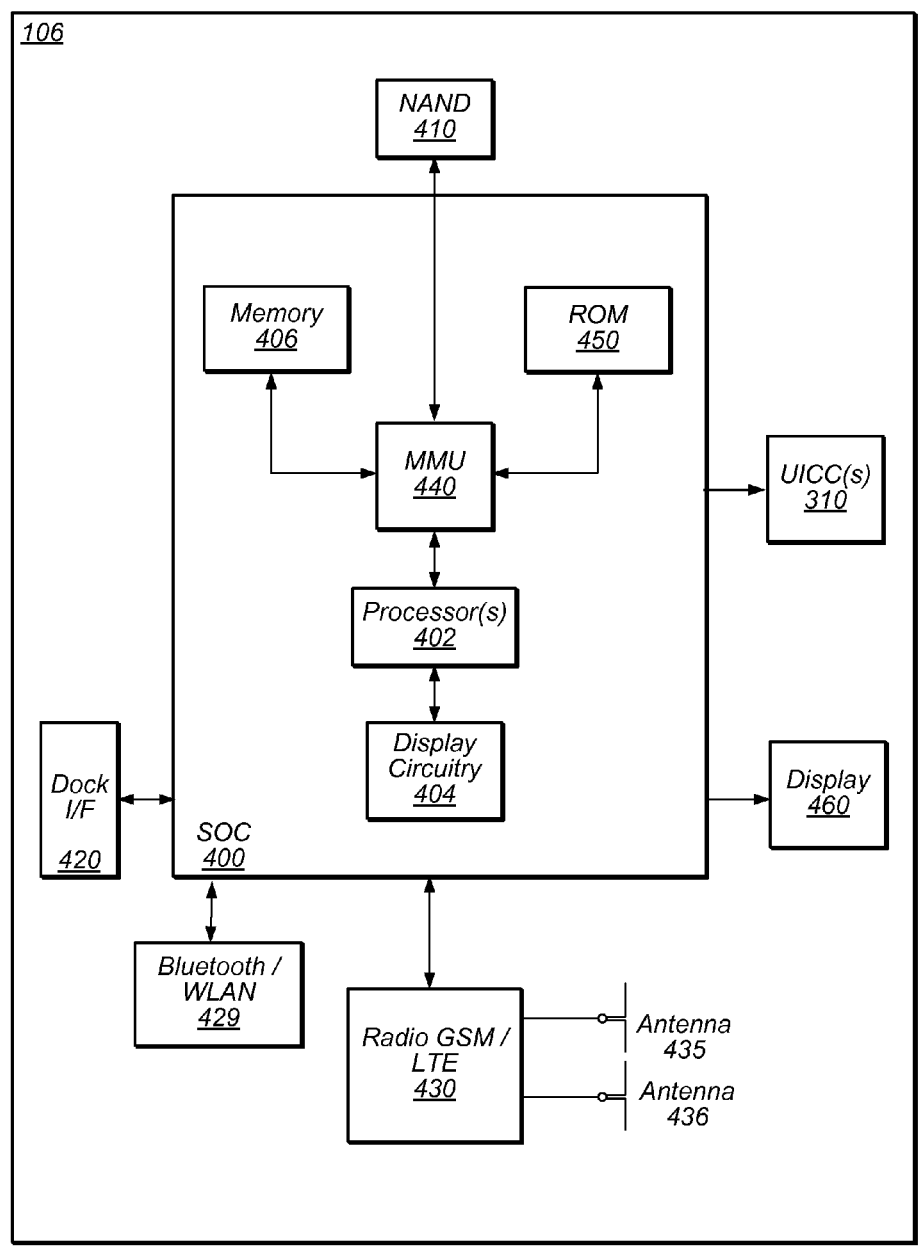
FIG. 4 is an example block diagram of a UE, according to one embodiment.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, TDS, etc., and short range wireless communication circuitry 429 (e.g., Bluetooth and WLAN circuitry). The UE 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the UE 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card. Thus the smart card(s) 310 may be one or more removable smart cards (such as UICC cards, which are sometimes referred to as "SIM cards"), and/or the smart card(s) 310 may be one or more embedded cards (such as embedded UICCs (eUICCs), which are sometimes referred to as "eSIMs" or "eSIM cards"). In some embodiments (such as when the smart card(s) 310 include an eUICC), one or more of the smart card(s) 310 may implement embedded SIM (eSIM) functionality; in such an embodiment, a single one of the smart card(s) 310 may execute multiple SIM applications. Each of the smart card(s) 310 may include components such as a processor and a memory; instructions for performing SIM/eSIM functionality may be stored in the memory and executed by the processor. In one embodiment, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

As noted above, in one embodiment, the UE 106 comprises two or more smart cards 310, each implementing SIM functionality. The inclusion of two or more SIM smart cards 310 in the UE 106 may allow the UE 106 to support two different telephone numbers and may allow the UE 106 to communicate on corresponding two or more respective networks. For example, a first smart card 310 may comprise SIM functionality to support a first RAT such as LTE, and a second smart card 310 may comprise SIM functionality to support a second RAT such as GSM. Other implementations and RATs are of course possible. Where the UE 106 comprises two smart cards 310, the UE 106 may support Dual SIM Dual Active (DSDA) functionality. The DSDA functionality may allow the UE 106 to be simultaneously connected to two networks (e.g., and use two different RATs) at the same time. The DSDA functionality may also allow the UE 106 may to simultaneously receive voice calls or data traffic on either phone number. In another embodiment, the UE 106 supports Dual SIM Dual Standby (DSDS) functionality. The DSDS functionality may allow either of the two smart cards 310 in the UE 106 to be on standby waiting for a voice call and/or data connection. In DSDS, when a call/data is established on one SIM 310, the other SIM 310 is no longer active. In one embodiment, DSDx functionality (either DSDA or DSDS functionality) may be implemented with a single smart card (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5A:
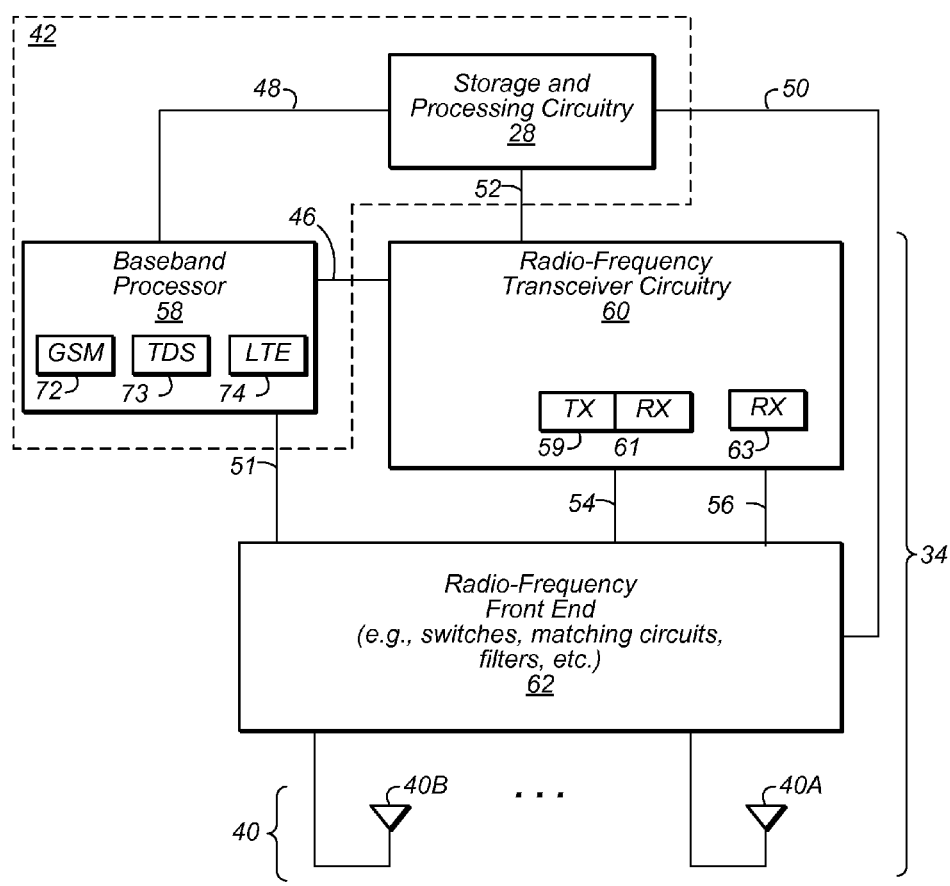
FIGS. 5A and 5B are example block diagrams of wireless communication circuitry in the UE, according to one embodiment.
Figure 5B:
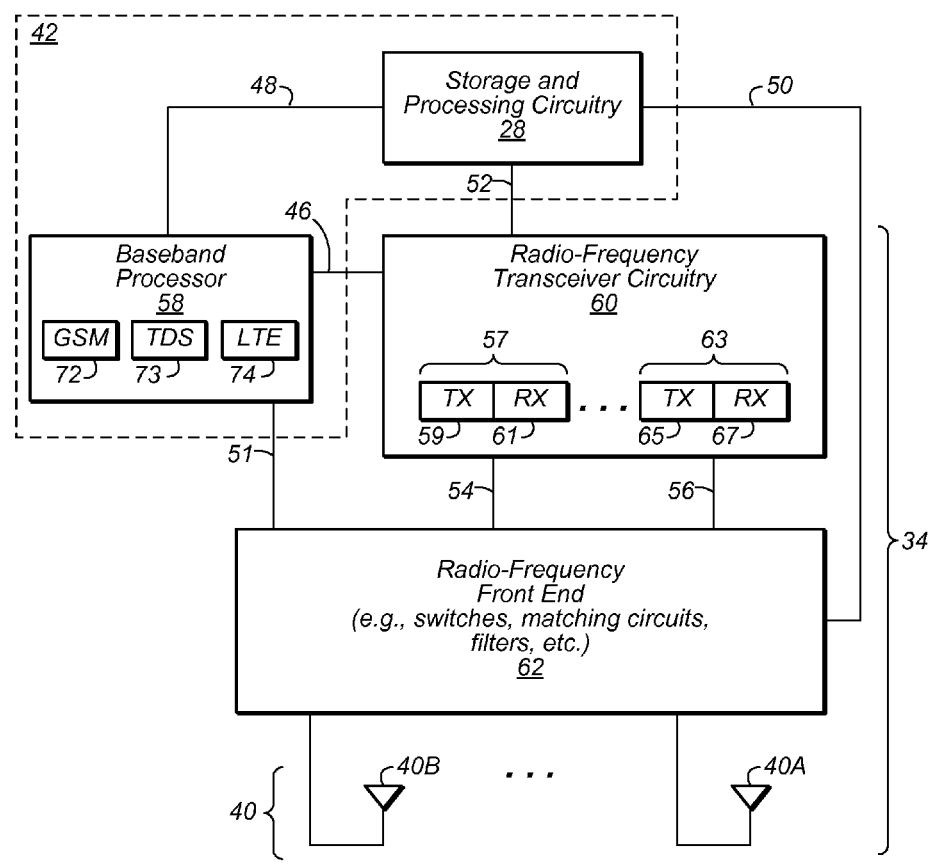

FIGS. 5A and 5B—UE Transmit/Receive Logic

FIG. 5A illustrates a portion of UE 106 according to one embodiment. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM logic 72, TDS logic 73, LTE logic 74, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 comprises transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus the TX chain 59 and the two RX chains 61 and 63 may be considered, along with other necessary circuitry, as a single radio. Other embodiments are of course contemplated. For example, the radio-frequency transceiver circuitry 60 may comprise only a single TX chain and only a single RX chain, also a single radio embodiment. Thus the term "radio" may be defined to have the broadest scope of its ordinary and accepted meaning, and comprises the circuitry normally found in a radio, including either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may comprise their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments of the invention described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5B, the radio-frequency transceiver circuitry 60 may also comprise two or more TX chains and two or more RX chains. For example, FIG. 5B shows an embodiment with a first radio 57 comprising TX chain 59 and RX chain 61 and a second radio 63 comprising a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, e.g., the second radio is turned off to save power, certain embodiments of the invention described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Echo or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE 106. For example, as shown in FIG. 5A, in normal LTE operations, antennas 40A and 40B may be used with respective receivers 61 and 63 to implement a receive diversity scheme, such as for MIMO operations. With this type of arrangement, two LTE data streams may be simultaneously received and processed using baseband processor 58. When it is desired to monitor a GSM paging channel for incoming GSM pages, one or both of the antennas may be temporarily used in receiving GSM paging channel signals.

Control circuitry 42 may be used to execute software for handling more than one radio access technology. For example, baseband processor 58 may include memory and control circuitry for implementing multiple protocol stacks such as a GSM protocol stack 72, a TDS protocol stack 73, and an LTE protocol stack 74. Thus, protocol stack 72 may be associated with a first RAT such as GSM (as an example), protocol stack 73 may be associated with a second RAT such as TDS, and protocol stack 74 may be associated with a third RAT such as LTE (as an example). During operation, UE 106 may use GSM protocol stack 72 to handle GSM functions, TDS protocol stack 73 to handle TDS functions, and may use LTE protocol stack 74 to handle LTE functions. Additional protocol stacks, additional transceivers, additional antennas 40, and other additional hardware and/or software may be used in UE 106 if desired. The arrangement of FIGS. 5A and 5B is merely illustrative. In one embodiment, one or both of the protocol stacks may be configured to implement the methods described in the flowcharts below.

In one embodiment of FIG. 5A (or 5B), the cost and complexity of UE 106 may be minimized by implementing the wireless circuitry of FIG. 5A (or 5B) using an arrangement in which baseband processor 58 and radio-transceiver circuitry 60 are used to support GSM, TDS, and LTE traffic, although other embodiments are envisioned which use more than one radio and/or further radio frequency circuitry.

The GSM radio access technology may generally be used to carry voice traffic, whereas the LTE radio access technology may generally be used to carry data traffic. To ensure that GSM voice calls are not interrupted due to LTE data traffic, GSM operations may take priority over LTE operations. To ensure that operations such as monitoring a GSM paging channel for incoming paging signals do not unnecessarily disrupt LTE operations, control circuitry 42 can, whenever possible, configure the wireless circuitry of UE 106 so that wireless resources are shared between LTE and GSM functions. Similar remarks apply to combinations of TDS and LTE and GSM and TDS.

When a user has an incoming GSM call, the GSM network may send UE 106 a paging signal (sometimes referred to as a page) on the GSM paging channel using base station 102. When UE 106 detects an incoming page, UE 106 can take suitable actions (e.g., call establishment procedures) to set up and receive the incoming GSM call. Pages are typically sent several times at fixed intervals by the network, so that devices such as UE 106 will have multiple opportunities to successfully receive a page.

Proper GSM page reception may require that the wireless circuitry of UE 106 be periodically tuned to the GSM paging channel, referred to as a tune-away operation. If the transceiver circuitry 60 fails to tune to the GSM paging channel or if the GSM protocol stack 72 in baseband processor 58 fails to monitor the paging channel for incoming pages, GSM pages will be missed. On the other hand, excessive monitoring of the GSM paging channel may have an adverse impact on an active LTE data session. Embodiments of the invention may comprise improved methods for handling tune-away operations, as described below.

In some embodiments, in order for the UE 106 to conserve power, the GSM, TDS, and LTE protocol stacks 72, 73, and 74 may support idle mode operations. Also, one or multiple of the protocol stacks 72-74 may support a discontinuous reception (DRX) mode and/or a connected discontinuous reception (CDRX) mode. DRX mode refers to a mode which powers down at least a portion of UE circuitry when there is no data (or voice) to be received. In DRX and CRDX modes, the UE 106 synchronizes with the base station 102 and wakes up at specified times or intervals to listen to the network. DRX is present in several wireless standards such as UMTS, LTE (Long-term evolution), WiMAX, etc. The terms "idle mode", "DRX" and "CDRX" are explicitly intended to at least include the full extent of their ordinary meaning, and are intended to encompass similar types of modes in future standards.

Figure 6:
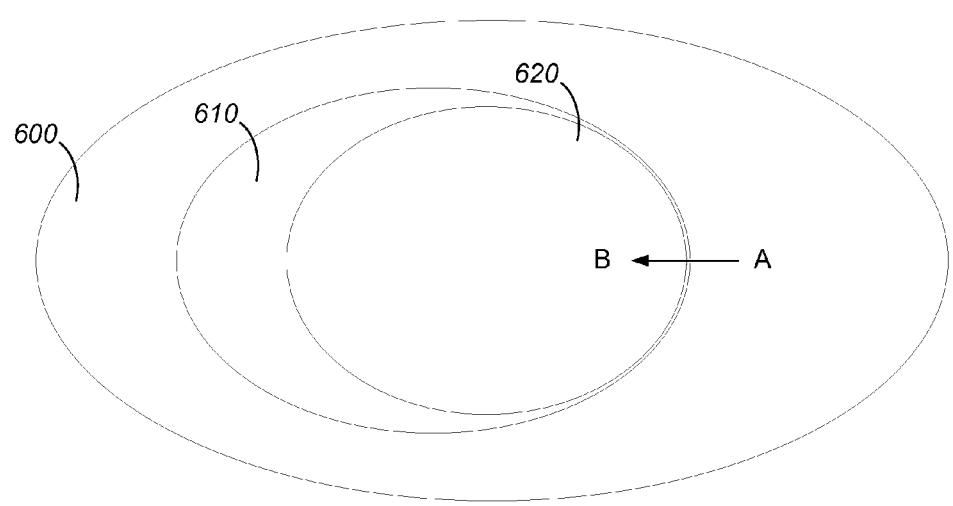
FIG. 6 illustrates an exemplary wireless communication environment, according to one embodiment.

FIG. 6—Transitioning from a First RAT to a Third RAT

FIG. 6 illustrates an exemplary wireless environment involving three different RATs, which may be applicable to various embodiments discussed in the following flowcharts. However, this embodiment is exemplary only and other variations are envisioned.

As shown, a first RAT (e.g., 2G, such as GSM) may have a service area 600 that includes both a second RAT (e.g., 3G, such as TDS) service area 610 and a third RAT (e.g., 4G, such as LTE) service area 620. Each of these service areas may be provided by a base station corresponding to each respective RAT, e.g., the first RAT service area 600 may be a cell of the first RAT, the second RAT service area 610 may be a cell of the second RAT, and the third RAT service area 620 may be a cell of the third RAT. Thus, in FIG. 6, the first (e.g., 2G) has a larger service area 600 than the second (e.g., 3G) RAT service area 610, which in turn has a larger service area than the third (e.g., 4G) RAT service area 620. A UE may initially be connected to the first RAT in location A and may travel to location B within the service area of the second and third RATs. In this exemplary wireless environment, the second RAT may provide information regarding the third RAT and the third RAT may provide information regarding the fourth RAT, but the second RAT may not provide information regarding the fourth RAT (e.g., information usable to perform handover from the second RAT to the fourth RAT). As discussed above, the UE may use a single or multiple radios to communicate using the first, second, and third RATs, as desired.

In such wireless environments, a typical procedure may involve the UE transitioning from the first RAT to the second RAT, and then when possible, transitioning from the second RAT to the third RAT. However, this two-step reselection process may take more than fifteen seconds, which is undesirable. In order to address this long delay in transitioning from the first RAT to the third RAT, various embodiments are described below.

For example, in one embodiment, the UE may receive information regarding the third RAT (such as neighboring base station information or frequency information of the third RAT) from the second RAT, e.g., without attaching to the second RAT or transitioning from the first RAT to the second RAT. As one particular example, during a neighbor base station (or cell) evaluation procedure for the first RAT, the UE may schedule receiving system information from one or more second RAT base stations neighboring the current location. From this system information (e.g., from system information block (SIB) 19), the UE may determine the third RAT (e.g., LTE) base station configuration, which may be used to perform measurement or detection of base stations of the third RAT. Consequently, if the signal quality and/or other metrics of one or more candidate third RAT base stations pass a threshold, the UE may transition from the first RAT to the third RAT, e.g., instead of to the second RAT, and without transitioning to the second RAT in between the first and third RAT. Further exemplary description regarding this embodiment are discussed below, with regard to FIGS. 7-9.

Additionally, or alternatively, the UE may be configured to use pre-stored information for performing third RAT detection, measurement, synchronization, etc. For example, the UE may store a frequency list (e.g., an evolved absolute radio frequency channel number (EARFCN) list) associated with the third RAT, which may be used to perform detection or measurement of base stations of the third RAT. The information (e.g., the frequency list) may not have been received from the first RAT and/or the second RAT, e.g., at or near the time of the measurement. For example, the information may have been loaded in firmware of the UE prior to purchase by a user. Alternatively, the information may have been updated or downloaded at a prior time, e.g., a time that was not substantially near to the measurement of the third RAT, such as more than 10 minutes, a few hours, a few days, etc. In some embodiments, the information (e.g., the frequency list) may be managed and pushed by access points or base stations (e.g., at a prior time) based on geographic information. Additionally, or alternatively, the information may be obtained from or augmented by UE historical third RAT information (e.g., a history of base stations detected and/or attached with for the third RAT by the UE. Thus, in this embodiment, this information may be used similar to the information obtained from the second RAT above, e.g., the UE may behave as though the information that it is using (e.g., previously stored information) was obtained via the second RAT, as in the embodiment discussed above.

In one embodiment, the UE may concurrently attempt to transition from the first RAT to the second RAT. For example, the UE may initiate a transition from the first RAT to the second RAT and may then begin the measurement or search process for the third RAT. For example, there may be a time threshold (e.g., Tresel, which may last as five seconds) for performing the transition from the first RAT to the second RAT. During this time, the UE may perform the third RAT measurement process. This third RAT measurement process may be able to be completed within or in between cycles (e.g., discontinuous reception (DRX)) cycles of the first RAT and may also not impact measurement and evaluation of the second RAT selection process. Accordingly, if the selection process to the third RAT is unsuccessful (e.g., an appropriate base station of the third RAT is not found or is unable to be attached to), the transition to the second RAT may be performed instead. Alternatively, if the transition process to the third RAT is successful, the transition to the second RAT may be aborted or abandoned.

Note that the detection process of the third RAT may be impacted by location and/or motion information. For example, if the UE has previously determined that no third RAT base station is available at a location, it may not perform further searches or detections at that location, or the time period between performing the searches may be increased. In one embodiment, if a prior search was performed and no suitable base station is found, third RAT searching may be disabled until the UE moves from its location.

In addition, information related to the success or failure of specific base stations may be stored. For example, if the UE was unable to successfully attach to a third RAT base station, information related to that failure may be stored. This information may be used in various manners, e.g., to bar future attempts to attach to that particular base station (e.g., at or near a similar location), for statistics regarding that base station for later determining whether to attempt to attach to that base station, etc. Similarly, if the UE was successful in transitioning to the base station, then information indicating that success may be stored. Further, information associating that base station with the location may be stored, e.g., for future times when the UE is in that or a nearby location. The UE may be configured to build historical base station lists for various geographical locations, if desired.

By performing one or more of these embodiments, the need to reselect from the first RAT to the second RAT before transitioning to the third RAT may be eliminated. Additionally, second RAT location update and routing update procedures may be avoided. Skipping these steps may result in decreasing the delay for transitioning from the first RAT to the third RAT and may also reduce the occurrence of the UE missing pages, e.g., of the first RAT.

Figure 7:
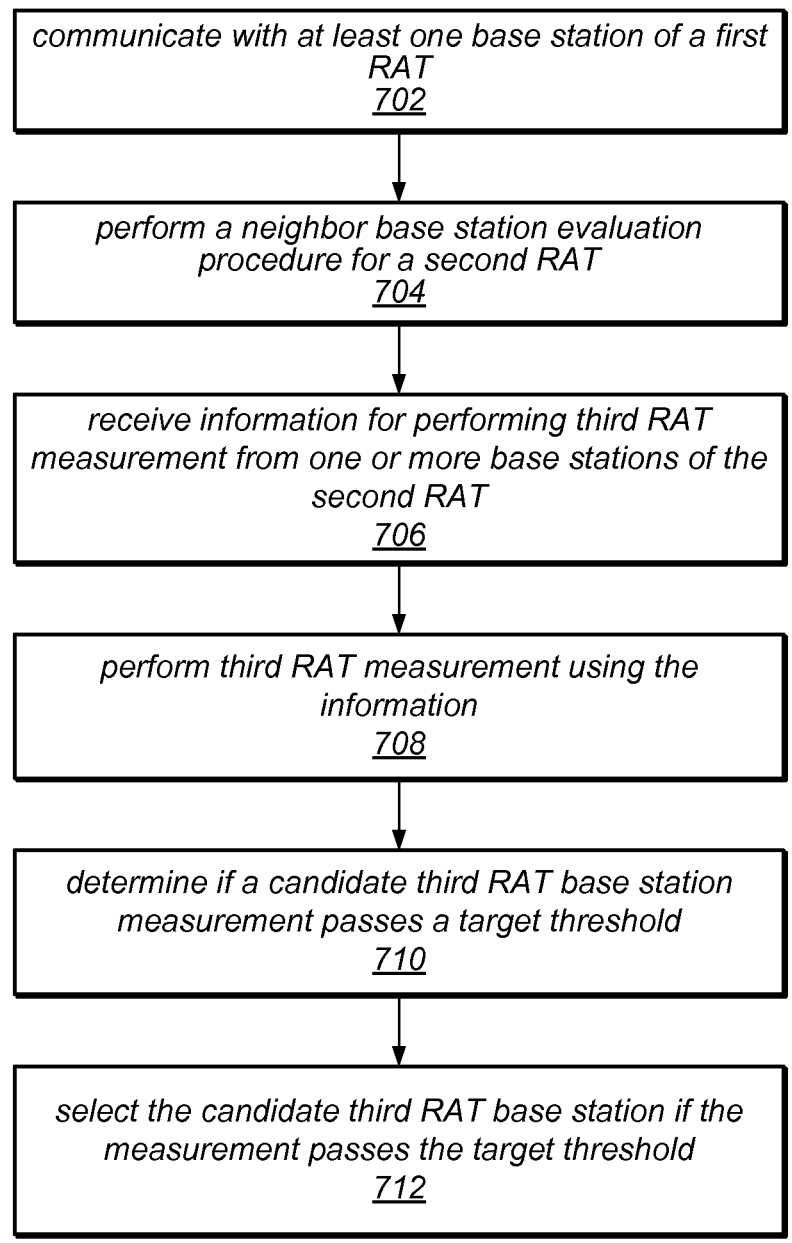
FIG. 7 is a flowchart diagram illustrating an exemplary method for transitioning from a first RAT to a third RAT using information obtained from a second RAT.

FIG. 7—Transitioning from a First RAT to a Third RAT Using Information from a Second RAT FIG. 7 is a flowchart diagram illustrating a method for transitioning from a first RAT to a third RAT using information from a second RAT. The method may be performed by a UE device (such as UE 106) that uses a single radio or multiple radios for a first RAT, a second RAT, and a third RAT (e.g., GSM, TDS, and LTE, respectively, although other combinations of RATs are envisioned). The method shown in FIG. 7 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 702, the UE may communicate with at least one base station of a first RAT. More specifically, the UE may be camped on a base station of the first RAT. As noted above, in one embodiment, while the base station of the first RAT may provide information (e.g., a frequency list or neighbor list, among other possibilities) for performing measurement or detection of base stations for the second RAT, it may not provide such information for the third RAT. The first RAT may be a 2G network such as GSM, the second RAT may be a 3G network such as TDS, and the third RAT may be a 4G network such as LTE, although other variations are envisioned.

In 704, the UE may perform a neighbor base station evaluation procedure for a second RAT. For example, 704 may be performed as part of a scheduled process for inter-RAT searching, e.g., associated with the first RAT. During this procedure, the UE may continue to be attached or otherwise maintain a connection to the base station of the first RAT (e.g., possibly using a single cellular radio for both maintaining the connection and performing the second RAT evaluation procedure).

In 706, the UE may receive information or performing third RAT measurement from one or more base stations of the second RAT based on performing the neighbor base station evaluation procedure for the second RAT in 704. The information may be received without attaching or camping on the second RAT. For example, the information may be comprised in system information (e.g., within a system information block (SIB), such as SIB 19. This information may include a frequency list (e.g., an EARFCN list), a neighbor list, and/or other information associated with performing measurement for the third RAT.

In 708, the UE may perform third RAT measurement using the information. Various different scanning procedures may be used to perform the detection, measurement, synchronization, or searching necessary for 708. During the measurement process, the UE may identify one or more candidate third RAT base stations, to which the UE may transition from the base station of the first RAT.

In 710, the UE may determine if a candidate third RAT base station measurement passes one or more threshold(s). More specifically, the UE may determine various signal quality or strength metrics that may be used to determine if the third RAT base station may be acceptable for attachment. For example, one or more of these metrics (or some combination metric) may be compared to appropriate threshold(s) indicating that the third RAT base station would be appropriate for attachment.

In 712, the UE may transition from the base station of the first RAT to the base station of the third RAT if the measurement passes the target threshold(s) in 710. In one embodiment, the UE may transition from the first RAT to the third RAT without attaching to the second RAT.

In one embodiment, in addition to the various method elements discussed above, the UE may concurrently attempt to transition from the first RAT to the second RAT. For example, the UE may initiate a transition from the first RAT to the second RAT prior to 708 and may then begin the measurement or search process for the third RAT in 708. For example, there may be a time threshold (e.g., Tresel, which may last as five seconds) for performing the transition from the first RAT to the second RAT. During this time, the UE may perform the third RAT measurement process. This third RAT measurement process may be able to be completed within or in between cycles (e.g., discontinuous reception (DRX)) cycles of the first RAT and may also not impact measurement and evaluation of the second RAT selection process. Accordingly, if the selection process to the third RAT is unsuccessful (e.g., an appropriate base station of the third RAT is not found or is unable to be attached to), the transition to the second RAT may be performed instead. Alternatively, if the transition process to the third RAT is successful, the transition to the second RAT may be aborted or abandoned.

Figure 8:
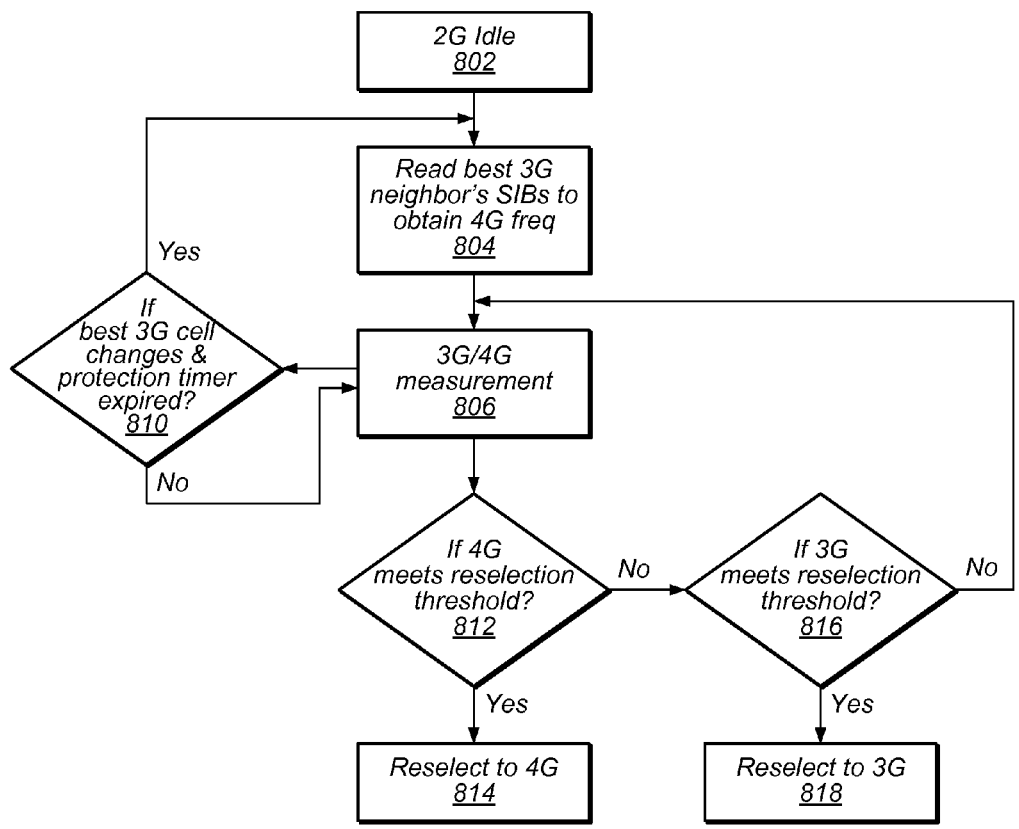
FIG. 8 is a flowchart diagram illustrating an exemplary embodiment of the method of FIG. 7.
Figure 9:
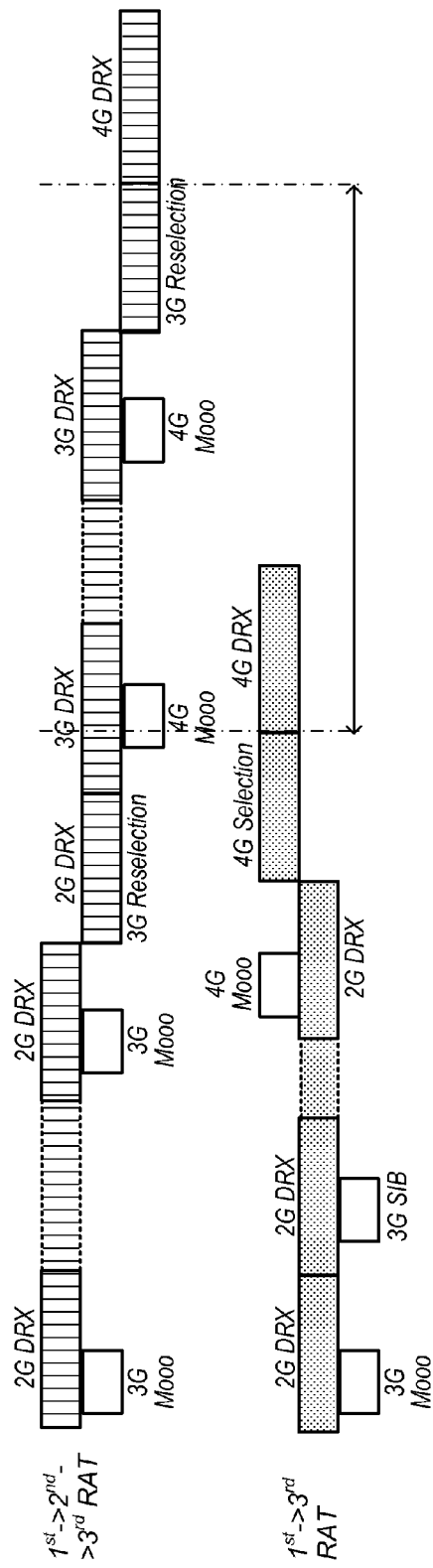
FIG. 9 is a timing diagram corresponding to the embodiment of FIG. 8.

FIGS. 8 and 9—Exemplary Embodiments Corresponding to the Method of FIG. 7

FIG. 8 is a flowchart diagram showing a specific embodiment corresponding to the method of FIG. 7. FIG. 9 illustrates an exemplary timing diagram that may correspond to the embodiments of FIGS. 7 and 8.

In particular, in 802, the UE may idle on a 2G RAT.

In 804, the UE may read one or more SIBs from a neighboring 3G RAT, e.g., a best base station of the 3G RAT, such as based on signal strength or quality metrics. These SIB(s) may provide information to obtain frequency information for performing measurement of base stations of the 4G RAT.

In 806, the UE may perform the 3G and/or 4G RAT measurement. Note that in 808, the UE may periodically or repeatedly determine if the 3G RAT base station is still the appropriate base station to use or if a protection timer has expired. If either of these events occur, the method may return to 804.

In 810, after measurement, if a candidate 4G RAT base station meets a reselection threshold, the UE may transition from the 2G RAT to the 4G RAT in 812.

In 814, if the candidate 4G RAT base station does not meet the reselection threshold, the UE may determine if a candidate 3G RAT base station meets a reselection threshold and transition from the 2G RAT to the 3G RAT in 816 if it does.

However, if it does not, the method may return to 806 and remain attached to the 2G RAT.

FIG. 9 illustrates an exemplary timing diagram comparing the time to transition from the 2G RAT to the 4G RAT with and without transitioning to the second RAT in between. More specifically, by adding the 3G SIB detection and corresponding 4G measurement, the UE is able to reduce the time to transition from the 2G RAT to the 4G RAT by the gap indicated in FIG. 9.

Note that while FIGS. 8 and 9 are described as 2G, 3G, and 4G RATs, these embodiments may also apply to other generation combinations as well. In other words, the RATs may be of any combination of generations, as desired.

Figure 10:
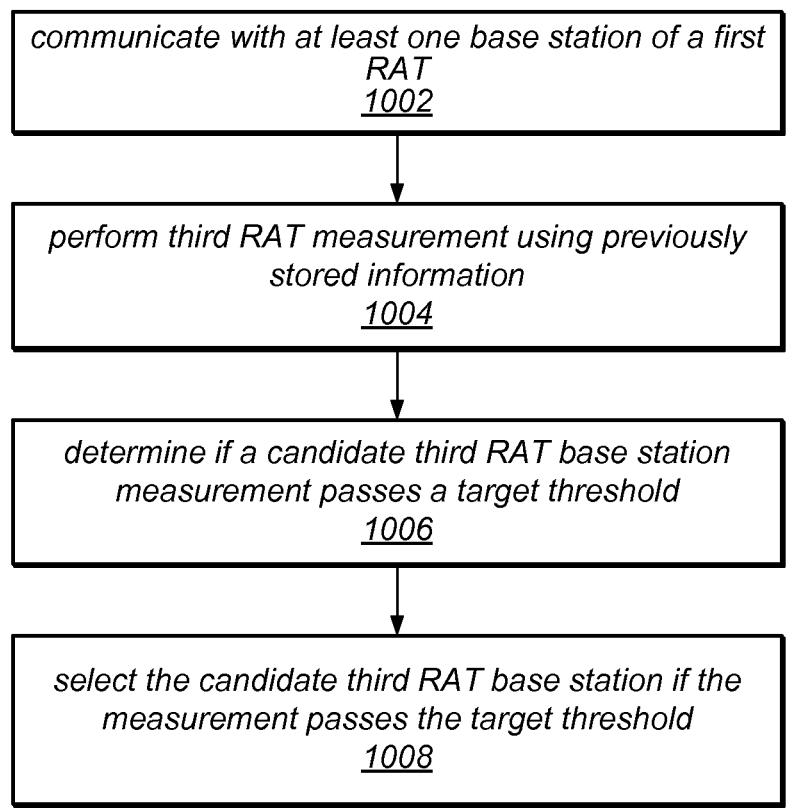
FIG. 10 is a flowchart diagram illustrating an exemplary method for transitioning from a first RAT to a third RAT using information previously stored by the UE.

FIG. 10—Transitioning from a First RAT to a Third RAT Using Previously Stored Information FIG. 10 is a flowchart diagram illustrating a method for transitioning from a first RAT to a third RAT using previously stored information. The method may be performed by a UE device (such as UE 106) that uses a single radio or multiple radios for a first RAT, a second RAT, and a third RAT (e.g., GSM, TDS, and LTE, respectively, although other combinations of RATs are envisioned). The method shown in FIG. 10 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 1002, the UE may communicate with at least one base station of a first RAT. More specifically, the UE may be camped on a base station of the first RAT. As noted above, in one embodiment, while the base station of the first RAT may provide information (e.g., a frequency list or neighbor list, among other possibilities) for performing measurement or detection of base stations for the second RAT, it may not provide such information for the third RAT. The first RAT may be a 2G network such as GSM, the second RAT may be a 3G network such as TDS, and the third RAT may be a 4G network such as LTE, although other variations are envisioned.

In 1004, the UE may perform third RAT measurement using previously stored information. For example, the UE may store a frequency list (e.g., an evolved absolute radio frequency channel number (EARFCN) list) associated with the third RAT, which may be used to perform detection or measurement of base stations of the third RAT. The information (e.g., the frequency list) may not have been received from the first RAT and/or the second RAT, e.g., at or near the time of the measurement. For example, the information may have been loaded in firmware of the UE prior to purchase by a user. Alternatively, the information may have been updated or downloaded at a prior time, e.g., a time that was not substantially near to the measurement of the third RAT, such as more than 10 minutes, a few hours, a few days, etc. In some embodiments, the information (e.g., the frequency list) may be managed and pushed by access points or base stations (e.g., at a prior time), e.g., based on geographic information of the UE. Additionally, or alternatively, the information may be obtained from or augmented by UE historical third RAT information (e.g., a history of base stations detected and/or attached with for the third RAT by the UE. Thus, in this embodiment, this information may be used similar to the information obtained from the second RAT above, e.g., the UE may behave as though the information that it is using (e.g., previously stored information) was obtained via the second RAT, as in the embodiment discussed above regarding FIGS. 7-9.

Various different scanning procedures may be used to perform the detection, measurement, synchronization, or searching necessary for 1004. During the measurement process, the UE may identify one or more candidate third RAT base stations, to which the UE may transition from the base station of the first RAT.

Additionally, note that the process in 1004 and subsequent steps may be performed in a periodic manner. For example, the UE may be configured to perform such measurement based on cycles of the first RAT (e.g., DRX cycles of the first RAT). However, where the UE is essentially "blindly" attempting to locate third RAT base stations, the UE may not search for third RAT base stations as would be normal, e.g., as would be performed if it were known that there were neighboring third RAT base stations, such as might be the case if the first RAT provided information concerning the third RAT. More specifically, the period for performing third RAT base station searching may be longer than the period for second RAT base station searching, e.g., since the first RAT may provide information regarding neighboring second RAT base stations. In addition, location information or movement information (or other information) may be used to determine whether to perform third RAT base station detection. For example, if a previous search did not reveal any candidate third RAT base stations, further searches may not be performed until the UE moves to a new location.

In 1006, the UE may determine if a candidate third RAT base station measurement passes one or more threshold(s). More specifically, the UE may determine various signal quality or strength metrics that may be used to determine if the third RAT base station may be acceptable for attachment. For example, one or more of these metrics (or some combination metric) may be compared to appropriate threshold(s) indicating that the third RAT base station would be appropriate for attachment.

In 1008, the UE may transition from the base station of the first RAT to the base station of the third RAT if the measurement passes the target threshold(s) in 710. In one embodiment, the UE may transition from the first RAT to the third RAT without attaching to the second RAT.

In one embodiment, in addition to the various method elements discussed above, the UE may concurrently attempt to transition from the first RAT to the second RAT. For example, the UE may initiate a transition from the first RAT to the second RAT prior to 1004 and may then begin the measurement or search process for the third RAT in 1004. For example, there may be a time threshold (e.g., Tresel, which may last as five seconds) for performing the transition from the first RAT to the second RAT. During this time, the UE may perform the third RAT measurement process. This third RAT measurement process may be able to be completed within or in between cycles (e.g., discontinuous reception (DRX)) cycles of the first RAT and may also not impact measurement and evaluation of the second RAT selection process. Accordingly, if the selection process to the third RAT is unsuccessful (e.g., an appropriate base station of the third RAT is not found or is unable to be attached to), the transition to the second RAT may be performed instead. Alternatively, if the transition process to the third RAT is successful, the transition to the second RAT may be aborted or abandoned.

Figure 11:
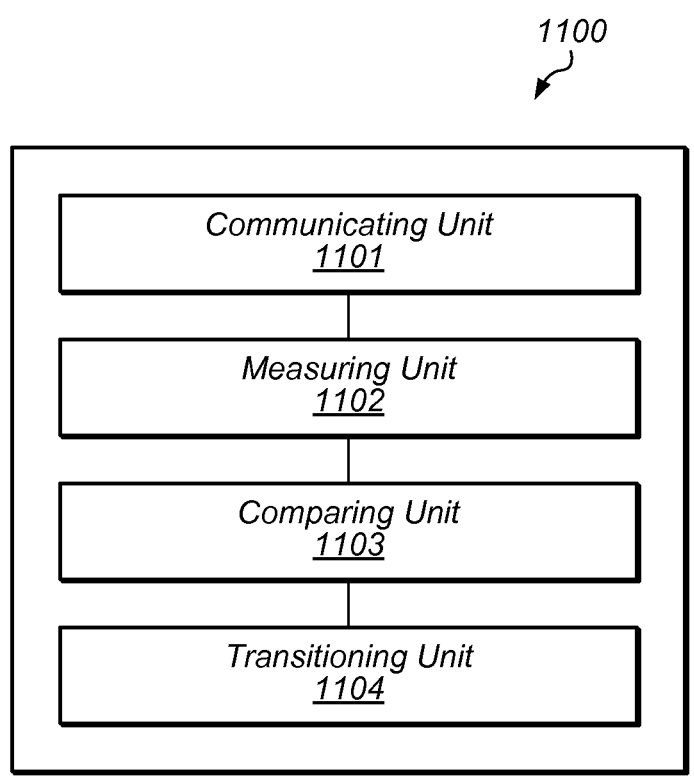
FIG. 11 is an example block diagram of a UE, according to one embodiment.

FIG. 11 is an example block diagram of a UE, according to one embodiment. As shown, the UE 1100 comprises: a communicating unit 1101 configured to communicate with a base station of the first RAT; a measuring unit 1102 configured to perform base station measurement of the second RAT, wherein the UE maintains a connection to the first RAT while performing the base station measurement of the second RAT, and wherein performing base station measurement of the second RAT is performed using previously stored frequency information of the second RAT; a comparing unit 1103 configured to compare one or more quality metrics of a base station of the second RAT to a threshold based on results of performing the base station measurement of the second RAT; and a transitioning unit 1104 configured to cause the UE to transition from the base station of the first RAT to the base station of the second RAT based on the one or more quality metrics of the base station of the second RAT exceeding the threshold.

In one embodiment, the UE may further comprise a reselection initiating unit configured to initiate reselection from the first RAT to a third RAT prior to performing base station measurement of the second RAT. In this embodiment, the base station measurement of the second RAT is performed during the reselection process from the first RAT to the third RAT. Accordingly, the transitioning unit is configured to cause the UE to transition to the second RAT instead of to the third RAT if the one or more quality metrics of the base station of the second RAT exceed the threshold, and the transitioning unit is configured to cause the UE to transition to the third RAT instead of to the second RAT if the one or more quality metrics of the base station of the second RAT do not exceed the threshold.

Alternatively or additionally, in one embodiment, the UE may comprise a storing unit configured to store information concerning the base station of the second RAT based on the one or more quality metrics of the base station and/or if the transition from the base station of the first RAT to the base station of the second RAT was successful.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs. For example, some or all of the units included in the UE as shown in FIG. 11 may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
at a user equipment device (UE) comprising one or more radios, wherein the one or more radios are configurable to operate according to a first radio access technology (RAT), a second RAT, and a third RAT:
communicating using the first RAT;
performing base station measurement of the second RAT, wherein the UE maintains a connection to the first RAT while performing the base station measurement of the second RAT;
obtaining information regarding one or more base stations of the third RAT from a base station of the second RAT during said performing the base station measurement of the second RAT;
transitioning from the first RAT to the third RAT based on said obtaining information regarding the one or more base stations of the third RAT, wherein said obtaining information and said transitioning is performed without the UE registering with the second RAT.

2. The method of claim 1, wherein said obtaining information regarding the one or more base stations of the third RAT comprises determining the information regarding the one or more base stations of the third RAT from system information received from the base station of the second RAT.

3. The method of claim 1, wherein the UE transitioning from the first RAT to the third RAT comprises:
determining if measurement of a base station of the one or more base stations in the third RAT is above a target threshold;
selecting the base station of the one or more base stations in the third RAT instead of a second RAT base station if the measurement of the base station of the one or more base stations in the third RAT is above the target threshold.

4. The method of claim 1, wherein the UE is unable to obtain information regarding the one or more base stations of the third RAT from the first RAT.

5. The method of claim 1, wherein the first RAT is a second generation RAT, wherein the second RAT is a third generation RAT, and wherein the third RAT is a fourth generation RAT.

6. The method of claim 5, wherein the first RAT comprises global system for mobile communications (GSM) and wherein the third RAT comprises long term evolution (LTE).

7. The method of claim 1, wherein the UE comprises a single radio for performing cellular communication and wherein said communicating, performing base station measurement, obtaining information, and transitioning is performed using the single radio.

8. The method of claim 1, wherein the UE comprises two smart cards which each implement SIM (Subscriber Identity Module) functionality, wherein the UE implements DSDA (Dual SIM Dual Active) functionality.

9. An apparatus for configuration in a user equipment device (UE), comprising:
one or more processing elements, wherein the one or more processing elements are configured to:
communicate using a first radio access technology (RAT);
perform base station measurement of a second RAT while maintaining a connection to the first RAT;
obtain information regarding one or more base stations of a third RAT from a base station of the second RAT during said performing the base station measurement of the second RAT;
transition from the first RAT to the third RAT based on said obtaining information regarding the one or more base stations of the third RAT, wherein said obtaining information and said transitioning is performed without registering with the second RAT.

10. The apparatus of claim 9, wherein said obtaining information regarding the one or more base stations of the third RAT comprises determining the information regarding the one or more base stations of the third RAT from system information received from the base station of the second RAT.

11. The apparatus of claim 9, wherein transitioning from the first RAT to the third RAT comprises:
determining when measurement of a base station of the one or more base stations in the third RAT is above a target threshold;
selecting the base station of the one or more base stations in the third RAT instead of a second RAT base station when the measurement of the base station of the one or more base stations in the third RAT is above the target threshold.

12. The apparatus of claim 9, wherein the apparatus is unable to obtain information regarding the one or more base stations of the third RAT from the first RAT.

13. The apparatus of claim 9, wherein the first RAT is a second generation RAT, wherein the second RAT is a third generation RAT, and wherein the third RAT is a fourth generation RAT.

14. The apparatus of claim 13, wherein the first RAT comprises global system for mobile communications (GSM) and wherein the third RAT comprises long term evolution (LTE).

15. A user equipment device (UE), comprising:
one or more radios, configurable to perform communication using a first radio access technology (RAT), a second RAT, and a third RAT; and
one or more processors coupled to the one or more radios, wherein the one or more processors and the one or more radios are configured to:
communicate using the first RAT;
perform base station measurement of the second RAT, wherein the UE maintains a connection to the first RAT while performing the base station measurement of the second RAT;
obtain information regarding one or more base stations of the third RAT from a base station of the second RAT during said performing the base station measurement of the second RAT;
transition from the first RAT to the third RAT based on said obtaining information regarding the one or more base stations of the third RAT, wherein said obtaining information and said transitioning is performed without the UE registering with the second RAT.

16. The UE of claim 15, wherein said obtaining information regarding the one or more base stations of the third RAT comprises determining the information regarding the one or more base stations of the third RAT from system information received from the base station of the second RAT.

17. The UE of claim 15, wherein transitioning from the first RAT to the third RAT comprises:
determining when measurement of a base station of the one or more base stations in the third RAT is above a target threshold;
selecting the base station of the one or more base stations in the third RAT instead of a second RAT base station when the measurement of the base station of the one or more base stations in the third RAT is above the target threshold.

18. The UE of claim 15, wherein the UE is unable to obtain information regarding the one or more base stations of the third RAT from the first RAT.

19. The UE of claim 15, wherein the first RAT is a second generation RAT, wherein the second RAT is a third generation RAT, and wherein the third RAT is a fourth generation RAT.

20. The UE of claim 15, wherein the UE comprises a single radio for performing cellular communication and wherein said communicating, performing base station measurement, obtaining information, and transitioning is performed using the single radio.

* * * * *